US008644480B2

(12) United States Patent
Taylor et al.

(10) Patent No.: US 8,644,480 B2
(45) Date of Patent: Feb. 4, 2014

(54) TELEPHONE CALL PROCESSING

(75) Inventors: Martin Taylor, Middlesex (GB);
Stephen Barnes, Middlesex (GB)

(73) Assignee: Metaswitch Networks, Ltd., Enfield (GB)

( * ) Notice: Subject to any disclaimer, the term of this patent is extended or adjusted under 35 U.S.C. 154(b) by 997 days.

(21) Appl. No.: 12/563,025

(22) Filed: Sep. 18, 2009

(65) Prior Publication Data

US 2010/0177882 A1 Jul. 15, 2010

(30) Foreign Application Priority Data

Dec. 4, 2008 (GB) .................................. 0822153.3

(51) Int. Cl.
*H04M 3/42* (2006.01)

(52) U.S. Cl.
USPC ............. 379/207.02; 379/201.01; 379/201.12

(58) Field of Classification Search
USPC ............. 379/207.02, 207.11, 207.16, 211.04, 379/219, 201.01–201.04, 201.12
See application file for complete search history.

(56) References Cited

U.S. PATENT DOCUMENTS

| 4,893,336 | A | * | 1/1990 | Wuthnow ................. 379/211.02 |
| 5,206,901 | A | * | 4/1993 | Harlow et al. ........... 379/211.04 |
| 5,901,209 | A | * | 5/1999 | Tannenbaum et al. ... 379/142.09 |
| 5,991,292 | A | * | 11/1999 | Focsaneanu et al. ......... 370/352 |
| 6,038,302 | A | * | 3/2000 | Burok et al. ............. 379/201.01 |
| 6,038,305 | A | * | 3/2000 | McAllister et al. ...... 379/201.02 |
| 6,404,858 | B1 | * | 6/2002 | Farris et al. ................ 379/88.02 |
| 6,587,458 | B1 | * | 7/2003 | Burg et al. .................... 370/356 |
| 7,636,429 | B2 | * | 12/2009 | Kwak ....................... 379/207.06 |
| 7,688,962 | B1 | * | 3/2010 | Knoerle et al. ........... 379/211.04 |
| 7,899,453 | B2 | * | 3/2011 | Zhang et al. ................ 455/432.1 |
| 7,965,706 | B2 | * | 6/2011 | Iwakawa et al. ............. 370/360 |
| 2001/0038689 | A1 | * | 11/2001 | Liljestrand et al. ...... 379/201.03 |
| 2004/0052350 | A1 | | 3/2004 | Jaroker |
| 2004/0180654 | A1 | * | 9/2004 | Chen ............................ 455/433 |

FOREIGN PATENT DOCUMENTS

WO 98/36583 A1 8/1998

* cited by examiner

*Primary Examiner* — William Deane, Jr.
(74) *Attorney, Agent, or Firm* — EIP US LLP

(57) ABSTRACT

Disclosed embodiments allow telephony services of different types to be provided by a telephone company at a service platform for telephone calls received at a local telephone exchange belonging to the telephone company, but which does not itself support services those different types of services. Additional embodiments allow for disabling a subscriber-configurability feature for a service of a first service type on the local exchange so as to prevent or inhibit a subscriber from configuring a setting which may interfere with services provided on the service platform.

24 Claims, 10 Drawing Sheets

TELEPHONE CALL PROCESSING

CROSS-REFERENCE TO RELATED APPLICATIONS

This application claims priority under 35 U.S.C. §119(a) to GB Application No. 0822153.3, filed on Dec. 4, 2008, the entire disclosure of which is hereby incorporated by reference.

BACKGROUND OF THE INVENTION

1. Field of the Invention

This application relates to methods and apparatus for providing services to subscribers in a telecommunications network. In particular, but not exclusively, this application relates to the delivery of advanced telephony services for calls received on local telephone exchange switches.

2. Description of the Related Technology

Local telephone exchange switches deliver telephony services to residential and business customers, including a variety of functions that enable such customers to control the behavior of incoming and outgoing telephone calls; for example, call forwarding services, whereby the customer can request that calls to their telephone number be diverted to some other telephone number.

Some users of telephony services desire more sophisticated control over the behavior of telephone calls than is commonly provided by the majority of local telephone exchange switches that are deployed in the Public Switched Telephone Network (PSTN). An established technique for the delivery of such advanced telephony services is to make use of a capability that is offered by some local telephone exchange switches known as Advanced Intelligent Network (AIN). By means of AIN, calls to specific numbers served by the local telephone exchange switch can trigger a query that is sent to an external computing system, and the response provided by this computing system can be interpreted by the local telephone exchange switch so as to determine how to treat the call. Commonly, the call is re-directed to another system which provides the means to play announcements, collect digits dialed by the caller, re-direct the call to the originally-called number or to some other destination, release the call, etc.

FIG. 1 is a diagram showing a telecommunications network according to the prior art. FIG. 1 shows a common channel signaling network operating according to the Signaling System 7, which is commonly referred to as an SS7 network. Such an SS7 network separates the media path by which voice media, i.e. the voice payload for telephone calls, from the signaling path by which signaling information such as call setup information passes. In FIG. 1, voice media for a telephone call conducted between telephones 100 and 102, passes through telephone switches 104 and 106, whilst the signaling information passes from switch 104 to signaling transfer points 108 and 110 to switch 106, rather than along the media path between switches 104 and 106. FIG. 1 shows switches 104 and 106 connecting the call between telephones 100 and 102 across the network, although in reality more switches (not shown) may be involved. FIG. 1 shows signaling transfer points (STPs) 108 and 110 transferring the necessary signaling information for the telephone call across the network, although in reality more STPs (not shown) may be involved. Although freeing up connections between switches for the flow of call media data compared to previous network configurations, a basic SS7 network has limited capabilities in terms of providing advanced telephony services.

FIG. 2 is a diagram showing a telecommunications network according to the prior art. In this network, an advanced telephone switch known as a Service Switching Point (SSP) allows advanced telephony services such as Advanced Intelligent Network (AIN) services to be provided on telephone calls that are received at the SSP. When a user of telephone 200 makes or receives a call, SSP 214 detects whether the user has advanced telephony services enabled, for example by reference to an advanced telephony service identifier associated with the user's telephone line such as an AIN trigger. An advanced telephony service identifier may include the advanced service user's telephone number. Once the SSP detects that the user is an advanced telephony services user, the SSP contacts a node 212 responsible for handling advanced telephony services in the network via STP 208. Node 212 may be a service platform such as a service control point (SCP) or application server which includes programmable data processing capabilities for control of one or more advanced telephony services. Provision of advanced telephony services may involve the SCP controlling an intelligent peripheral node 216 via a Primary Rate Interface (PRI) (or alternatively via an SS7 signaling connection) to provide advanced resources for the call, for example playing voice announcements, collecting DTMF tones from a user or other services. Some existing local telephone exchange switches do not provide the ability to generate at least some types of AIN queries that are triggered by incoming or outgoing calls.

United States patent application US-A-2004/0052350 describes a method whereby a service platform provider, separate from a local phone company, may provide advanced services, not provided by the local phone company, to customers of the local phone company. The customer, or the service platform provider, may purchase a call forwarding service from the local phone company and have phone calls, originally directed to a POTS line provided by the local phone company, forwarded to a service platform. This is used to provide the customer with advanced services according to a customer profile stored on the service platform, for example IP telephony. The service platform can also forward the phone call back to the original POTS line via a distinctive ring number which is different to the main telephone number of the customer. This enables a simultaneous ring service, allowing the customer to be contacted on a device associated with the service platform, for example, an IP telephone, as well as the POTS telephone, simultaneously, and allowing the customer to decide which telephone to answer. Since the service platform provider and the local phone company are different, the subscriber must deal with two different service providers and the services provided by each may have interworking difficulties.

In US-A-2004/0052350, a subscriber may be able to configure a service supported by their local exchange via an interface on their local exchange. The interface on the local exchange may require input of DTMF tones on a subscriber's telephone, whereas the service platform may require input on a different interface via a suitable computing device having network access. The subscriber may, due to lack of understanding of the interworking between the systems, configure the local exchange settings and the service platform settings in such a way that they conflict. For example, the subscriber may change the call forwarding number by which the call is forwarded the call to a service platform, thus unintentionally disabling the services provided by the service platform. Moreover, a setting for a service provided by the local exchange may interfere with a setting for a service provided by a service platform. This might involve settings on two different, unrelated services, or settings on related services which interact with each other in an unexpected and/or undesirable manner. It would therefore be desirable to provide techniques whereby a range of advanced telephony services can be delivered to customers connected to such legacy local telephone exchange switches, whilst reducing interworking difficulties between the services provided.

SUMMARY OF CERTAIN INVENTIVE ASPECTS

In accordance with a first aspect of the present invention, there is provided a method of providing services to a plurality of subscribers in a telecommunications network, the subscribers each having subscriber equipment, a main dialing number and a local exchange with which each of the main dialing numbers is associated, the services being of different types including a first service type and a second service type, each of the services of the first service type being supported by and having one or more subscriber-configurability features on the local exchange and each of the services of the second service type not being supported by the local exchange, the method comprising:

setting a call forwarding function at the local exchange for incoming calls directed to a main dialing number for a first subscriber, the call forwarding function, when set, forwarding the calls to a service platform separate from the local exchange;

triggering a first service of the second service type at the service platform for at least some incoming calls forwarded to the service platform by the call forwarding function;

forwarding at least some incoming calls from the service platform using an alternate dialing number for the first subscriber back to the local exchange;

directing incoming calls using the alternate dialing number for the first subscriber from the local exchange to the subscriber equipment for the first subscriber; and reconfiguring the local exchange for the first subscriber, the reconfiguring disabling a subscriber-configurability feature on the local exchange for a first service of the first service type, for the main dialing number for the first subscriber.

Hence, by use of the embodiments of the invention, telephony services of a second type may be provided by a telephone company at a service platform in relation to telephone calls received at a local telephone exchange belonging to the telephone company, but which does not itself support services of the second type or associated triggering to initiate the provision of services of the second type. At the same time, disabling a subscriber-configurability feature for a service of the first service type on the local exchange prevents or inhibits a subscriber from configuring a setting which may interfere with services provided on the service platform. Certain embodiments therefore help to prevent configuration and interoperability problems which may otherwise occur if the subscriber were free to alter a setting for a service of the first service type provided by the local exchange.

In embodiments of the invention, the first service of the first service type is triggered at the service platform for at least some incoming calls forwarded to the service platform by the call forwarding function. If a subscriber wishes to use services of both the first and second types, migrating both services of the first type and services of the second type over to a service platform instead of providing a mixture of services of the first type via a local exchange and services of the second type via a service platform can help to avoid configuration and interoperability conflicts between the different services which may be provided by different service providers.

In embodiments of the invention, the first service of the first service type is subscriber-configurable on the service platform by the first subscriber via a first user interface associated with the service platform. The first service of the second service type may also be subscriber-configurable on the service platform by the first subscriber via the first user interface. Therefore, for subscribers who use both types of service, the these embodiments allow an integrated and unified access interface to be provided at the service platform; a more constant look and feel to such an interface over both types of services is desirable when accessed for both subscriber customization and service provider administration purposes.

In embodiments of the invention, a second subscriber, not having a call forwarding function configured at the local exchange for forwarding incoming calls directed to a main dialing number for the second subscriber to the service platform, has the subscriber-configurability feature enabled on the local exchange for the first service of the first service type, for the main dialing number for the second subscriber. Hence, a subscriber who only uses services of the first type which are supported by the local exchange can configure their services on the local exchange as no interoperability problems can occur with other services being provided by the service platform.

In these embodiments, calls for subscribers who only require services of the first type are not forwarded to the service platform, so alternative dialing numbers are not required to direct calls back to the local exchange. The number of dialing numbers associated with a local exchange is limited, so efficient use of dialing numbers is preferable. The more dialing numbers a service provider uses up for their subscribers, the more costly providing such services will become for the service provider, which costs may then be passed on to the subscribers themselves. For a subscriber who requires services of both types, if a call for such a subscriber is to be directed back to their subscriber telephone, this can be achieved using an alternate telephone dialing number. Thus provision of services of both the first and second types is allowed in conjunction with efficient use of telephone dialing numbers, as alternate telephone dialing numbers are only used up as and when necessary for subscribers who require services of both the first and second types.

In embodiments of the invention, the first service of the first service type is subscriber-configurable by the second subscriber via a second, different, user interface associated with the local exchange. Services to users who only require services of the first type can remain having those services provided by the local exchange, the services being subscriber-configurable via an interface provided on the local exchange. The service platform interface may include a graphical user interface accessed via a web-server, whereas the local exchange interface may include a touch-tone Dual Tone Multi-Frequency (DTMF) telephone interface.

In embodiments of the invention, the reconfiguring comprises deactivating the first service of the first service type at the local exchange for the first subscriber. Hence, services of the first service type can be provided at the service platform instead of the local exchange for subscribers who require services of both first and second types. This can help to prevent conflicts between services operating on the local exchange and services operating on the service platform.

In some embodiments of the invention the first service of the first service type comprises a voicemail service. In other embodiments of the invention the first service of the first service type comprises a selective call forwarding service. In still other embodiments of the invention the first service of the first service type comprises an unconditional call forwarding service. Hence, a number of services of the first type can be provided at a local telephone exchange switch. Services of the first type will be referred to as non-advanced telephony services in the detailed description of the invention below.

Embodiments of the invention include setting a call forwarding function which comprises setting an unconditional call forwarding service on the local exchange for the first subscriber and the reconfiguring comprises deactivating subscriber-configurability of the unconditional call forwarding service for the first subscriber on the local exchange. Hence, if calls are unconditionally forwarded to the service platform for a first subscriber, the first subscriber can still use and configure an unconditional call forwarding service via the service platform.

In embodiments of the invention, services of the second service type may include a call rejection service, a selective call rejection service, a selective call acceptance service, a call screening service, an incoming call notification service, a simultaneous ring service, a find me/follow me service, or a customized ringback tones service. Hence, the embodiments of the present invention allow a wide variety of different telephony services to be provided, where if services of the second type are required by a given subscriber, then both services of the first type and services of the second type for the given subscriber are migrated over to a service platform. Services of the second type will be referred to as advanced telephony services in the detailed description below.

In terms of services of the second type, calls may be forwarded to a different telephone number, customized ringback tones or announcements may be provided to a calling party, calls to and from certain telephone numbers may be blocked or restricted, a series of digits may be collected for voting or menu navigation purposes, telephone numbers may be ported to other locations or exchanges, etc.

Embodiments of the invention include determining, at the service platform, for a given incoming call, whether to trigger the first service at the service platform, trigger the second service at the service platform, and/or forward the given incoming call from the service platform using the alternate dialing number, in dependence on one or more subscriber-configurable settings on the service platform. Hence, a call may be processed according to a number of subscriber-configurable settings or preferences chosen by the subscriber. The subscriber-configurable settings may include one or more default settings common to other subscribers and may be customized by subscribers such as via a web interface and web-server or other remote interface.

In embodiments of the invention, the reconfiguring is conducted in association with the setting of the call forwarding function for the first subscriber. Hence, when a subscriber requires a service of the first type, a call forwarding function can be set up to forward their calls to the service platform. At the same time, to prevent any interoperability problems occurring, subscriber configurability of the service of the first type at the local exchange is disabled as this can now be provided on the service platform instead.

In accordance with a second aspect of the present invention, there is provided a method of providing services to subscribers in a telecommunications network, the subscribers each having subscriber equipment, a main dialing number and a given local exchange with which each of the main dialing numbers is associated, the method comprising:

setting a local exchange to forward incoming calls directed to the main dialing number of a subscriber;

receiving an outgoing call request from first subscriber equipment associated with the subscriber;

in response to receipt of the outgoing call request, creating an incoming call using an alternate dialing number for the subscriber, the incoming call being directed towards subscriber equipment associated with the subscriber by the local exchange;

creating an outgoing call according to the outgoing call request; and bridging the incoming and outgoing calls. Hence, this aspect of the invention allows for provision of telephony services in conjunction with click-to-dial functionality by use of main and alternative dialing numbers. Such click-to-dial functionality can be especially useful when a subscriber has a relatively basic telephone such as an analogue telephone as a richer user interface may be realized via a data processing device. Outgoing calls for a subscriber telephone can be initiated via subscriber input on a personal computer or other such device.

In embodiments of the invention, the setting comprises setting a local exchange to forward incoming calls directed to the main dialing number of a subscriber to a service platform separate from the local exchange, and the method comprises triggering one or more services for at least some incoming calls for the subscriber at the service platform. Hence, services may be provided via a service platform instead of via the local exchange, which service platform may also receive outgoing call request and control the creation of outgoing calls accordingly.

Embodiments of the invention comprise an outgoing call request being initiated in response to input from the subscriber via a click-to-dial graphical user interface. Hence, a subscriber can select a contact to call via a user-friendly interface on a personal computer, for example clicking on an entry in an electronic address book through software running on the personal computer or hosted on a networked web-server.

Embodiments of the invention include an outgoing call being created using the main dialing number as a calling party identifier. Hence, a subscriber need only advertise their main dialing number to their contacts. Further, a called party will only be presented with the main dialing number when they receive a call from a subscriber, which can help to avoid return calls to the alternate dialing number.

In accordance with a third aspect of the present invention, there is provided a method of providing services to subscribers in a telecommunications network, the subscribers each having subscriber equipment, a main dialing number and a given local exchange with which each of the main dialing numbers is associated, the method comprising:

setting a local exchange to forward incoming calls directed to the main dialing number of a subscriber to a service platform separate from the local exchange;

triggering one or more services for at least some incoming calls for the subscriber at the service platform;

forwarding at least some incoming calls from the service platform using a first alternate dialing number for the subscriber back to the local exchange;

directing at least some of the incoming calls using the first alternate dialing number from the local exchange to the subscriber equipment for the subscriber;

directing at least some of the incoming calls using the second alternate dialing number from the local exchange to the subscriber equipment for the subscriber. Hence, services may be provided at a service platform using call forwarding on a main dialing number, and multiple users of a single subscriber telephone may receive incoming calls via the first and second alternate dialing numbers. This means that a Teen Line service may still be provided despite the main dialing number being employed for forwarding of calls to enable services to be applied at the service platform.

Embodiments of the invention include forwarding at least some incoming calls from the service platform using a second alternate dialing number for the subscriber back to the local exchange. Hence, advanced services may also be applied at the service platform in conjunction with the second alternate dialing number.

Embodiments of the invention include storing settings associated with the main dialing number for the subscriber; storing settings associated with the second alternate dialing number for the subscriber, wherein the settings associated with the main dialing number comprise one or more settings which are different to the settings associated with the second alternate dialing number. Hence, users of a single subscriber telephone may customize their services differently, for example the settings for one user may be applied at the service platform, whilst the settings for another user may be applied at the local exchange.

In embodiments of the invention a call directed to the subscriber equipment using the first alternate dialing number has a different associated ring-pattern to a call directed to the subscriber equipment using the second alternate dialing number. Hence, different users associated with a single subscriber telephone line may conveniently recognize just by listening whether a call is for them without having to answer the call.

In accordance with a fourth aspect of the present invention, there is provided apparatus adapted to perform the method of the first, second and third aspects of the present invention.

In accordance with a fifth aspect of the present invention, there is provided a computer program product comprising a computer-readable medium having computer readable instructions recorded thereon, the computer readable instructions being operative, when performed by a computerized device, to cause the computerized device to perform the method of the first, second and third aspects of the present invention.

Further features and advantages will become apparent from the following description of certain embodiments of the invention, given by way of example only, which is made with reference to the accompanying drawings.

DETAILED DESCRIPTION OF CERTAIN INVENTIVE EMBODIMENTS

Figure 1:
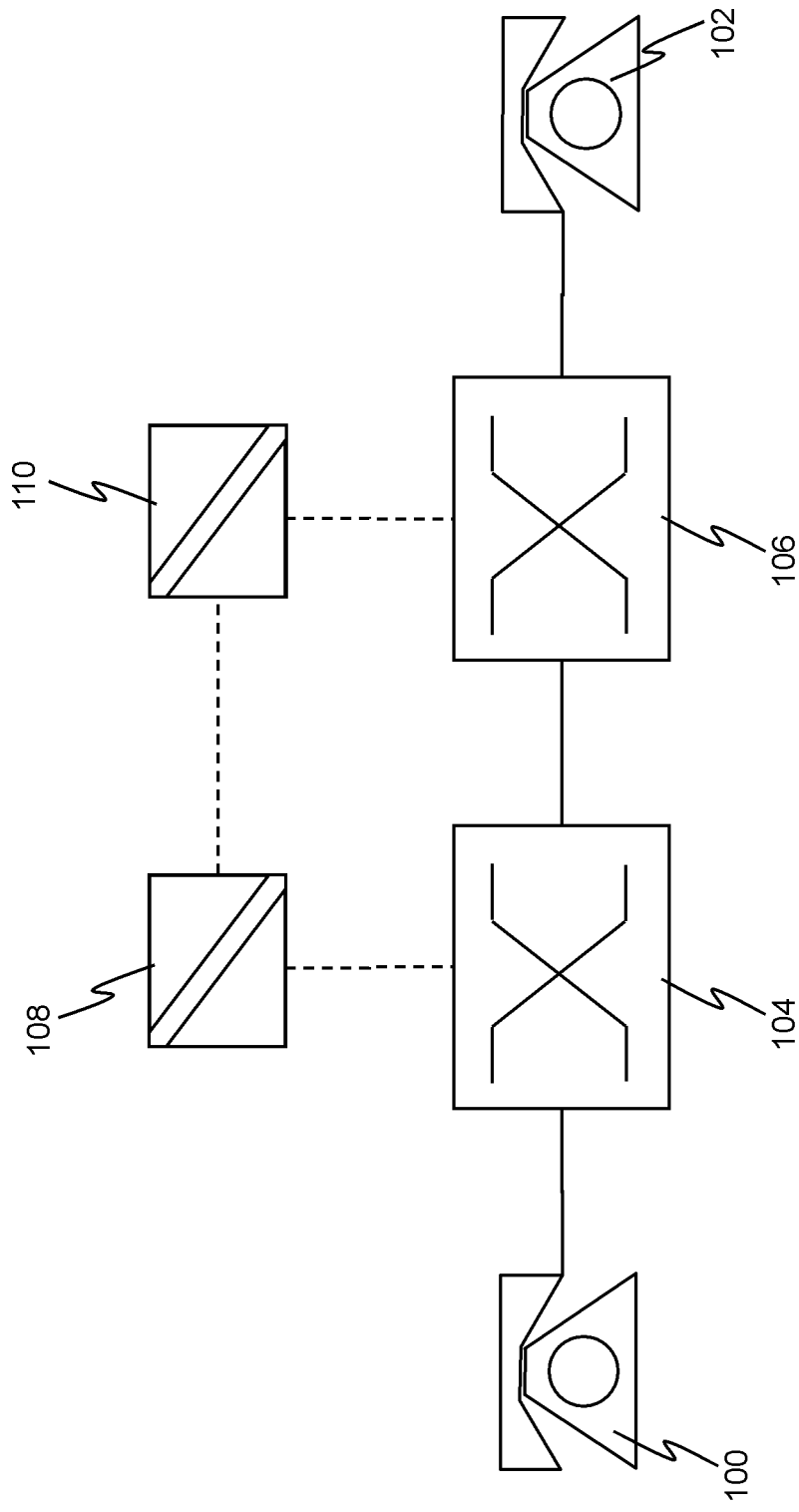
FIG. 1 is a diagram showing a telecommunications network according to the prior art.
Figure 2:
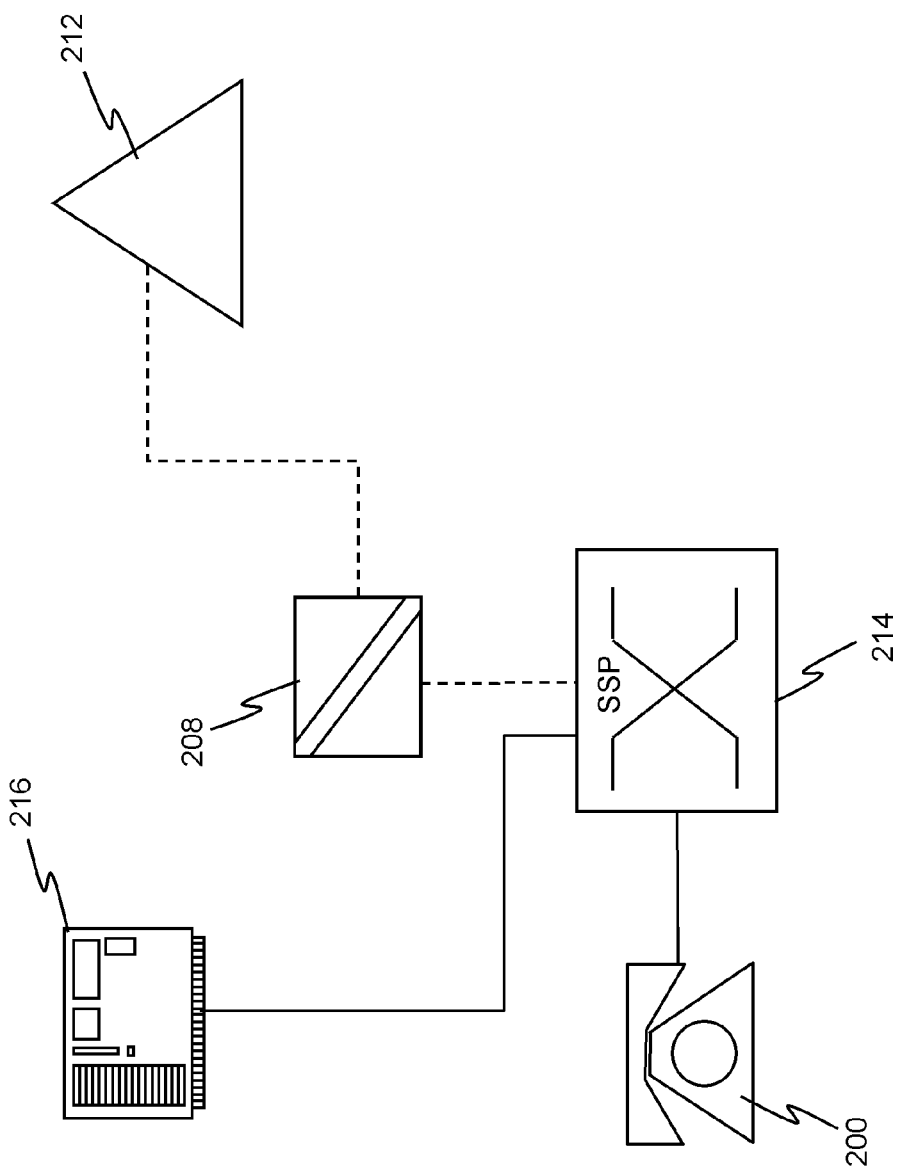
FIG. 2 is a diagram showing a telecommunications network according to the prior art.

The prior art telephone exchange switch 214 described above in relation to FIG. 2 supports SSP functionality and is thus able to detect when advanced telephony services should be applied to a call and can act accordingly, for example by providing the advanced telephony service itself or by contacting another network node such as SCP 212 which is capable of providing the advanced telephony service. However, many local telephone exchange switches are not provided with SSP functionality and do not support advanced services themselves. Such switches are unable to detect when SCP node 212 should be contacted in order to provide advanced telephony services for a call. Embodiments of the present invention provide methods and apparatus to provide advanced telephony services to users connected to such local telephone exchange switches.

Embodiments of the invention also provide advanced telephony services by employing telephone lines provided with two or more associated telephone directory or dialing numbers. This may involve use of a "Multiple Distinctive Ringing" service sometimes called "Teen Line" or "Teen Service" which many local telephone exchange switches provide whereby one or more additional dialing numbers may be assigned to a telephone line, and inbound calls to those numbers cause the call to be presented to the line, with the application of a distinctive ringing pattern.

Multiple Distinct Ringing services were originally designed to allow a family or group of co-inhabitants to have two (or more) dialing numbers assigned to a single telephone line in a household. Calls to the parents could be made using one of the assigned dialing numbers which would cause the telephone to ring with one ringing pattern. Calls to the children (or 'teens') could be made using the other assigned dialing number which would cause the telephone to ring with a different ringing pattern. By listening to the different ringing patterns, the parents and children would each know which calls are for them and which calls are not, so that the calls can be answered in a more efficient manner.

Figure 3:
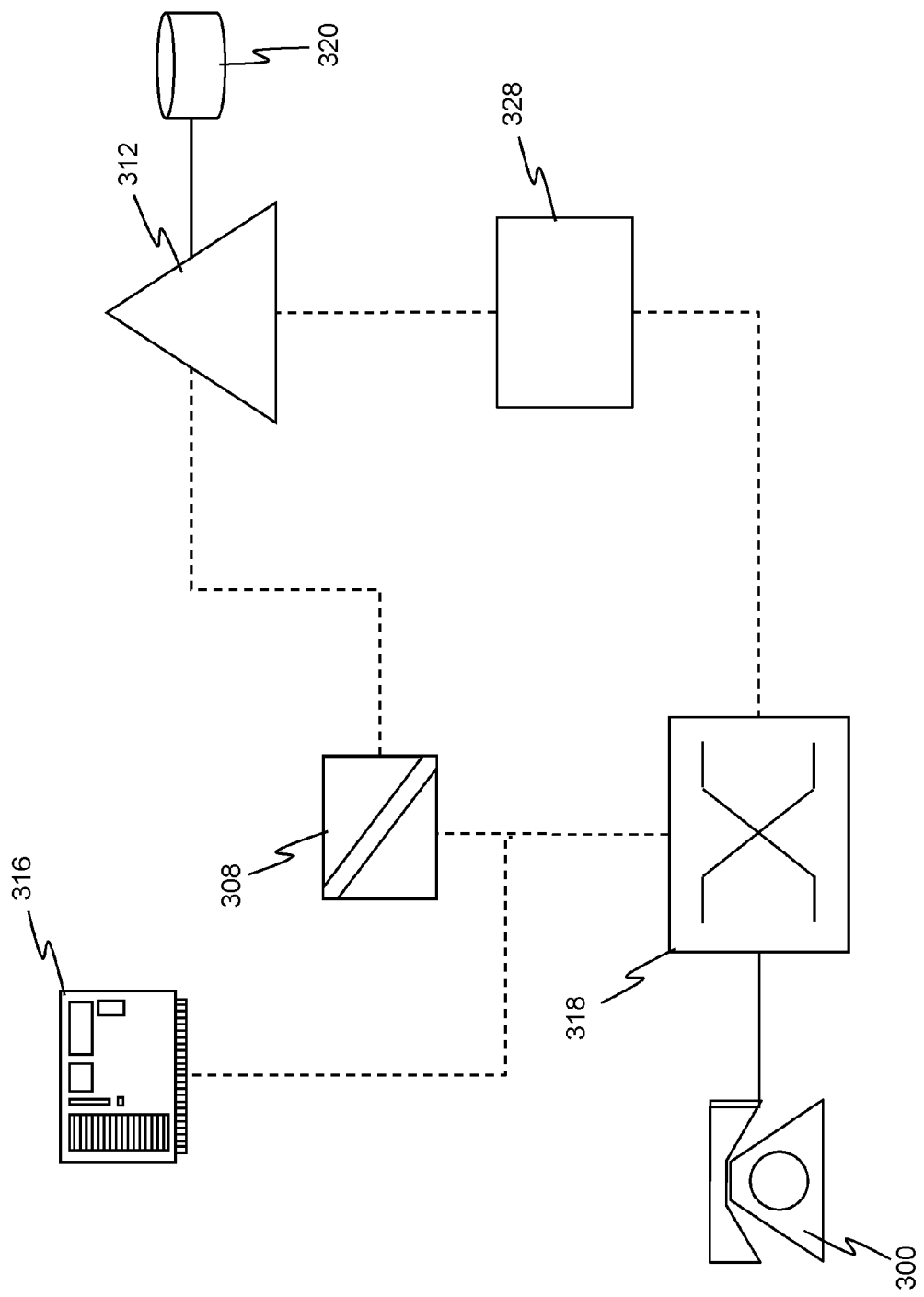
FIG. 3 is a diagram showing a telecommunications network according to embodiments of the present invention.

FIG. 3 is a diagram showing a telecommunications network according to embodiments of the present invention. These embodiments involve providing an advanced telephony services subscriber, i.e. a user of telephone 300 with a telephone line having both a main dialing number and an alternative dialing number. The alternative dialing number may for example be a teen line service dialing number which is provided in addition to a main line dialing number.

A local telephone exchange switch 318 which serves telephone 300 is configured to forward calls it receives directed to the main dialing number to a service platform 312 responsible for processing telephone calls for advanced telephony service subscribers. This can be achieved by enabling the Unconditional Call Forwarding function (sometimes known as Call Forwarding Variable) for the main dialing number of the line. Unconditional Call Forwarding is not enabled for the alternative dialing number.

Service platform 312 has access to a store 320 containing identifiers for subscribers and details of each subscriber's main and alternative dialing numbers. Store 320 also contains one or more subscriber-configurable settings and data relating to subscriber-configurability features for services associated with each subscriber. The subscriber-configurable settings may include one or more call processing rules which are processed by service platform 312 in order to determine how telephone calls for each subscriber should be processed. Some of the rules may be default rules initially set up by a service provider, some of the rules may be default rules which have been customized by a subscriber, and other rules may be created wholly by a subscriber. The contents of store 320 may be stored in memory on the service platform itself.

When an incoming call arrives at local telephone exchange switch 318 directed towards a subscriber's main dialing number, the call is forwarded to service platform 312 due to the unconditional call forwarding function that has been enabled for the main dialing number on the subscriber's line.

Service platform 312 analyses the call forwarded to it by local telephone exchange switch 318 and with reference to store 320 identifies the subscriber to whom the call was originally addressed. The subscriber may be identified by examining signaling information relating to the call destination for the call or through call forwarding, redirection, or diversion information associated with the call signaling.

Service platform 312 then applies whatever treatment is required on the call in accordance with any subscriber-configurability features and associated settings contained in store 320 which are associated with the subscriber that has been identified. Each subscriber may have one or more individually customized settings, which may be configured by the subscriber. The settings may also include one or more group or default settings which may be common to more than one subscriber.

One such setting may indicate that an advanced telephony service should be applied to the call, for example forwarding the call to another directory number or directing the caller to a messaging system. In such a case, service platform 312 may provide an advanced telephony service to the call itself, or route the call to another node in the network which is capable of providing an advanced telephony service to the call. This may involve routing the call to intelligent peripheral node 316.

Another such setting may indicate that the call should be directed back to subscriber equipment for the subscriber, i.e. telephone 300. In this case, however, service platform 312 does not send the call back to local telephone exchange switch 318 directly with the subscriber's main dialing number as the destination address, since in that case the call would be re-directed back to service platform 312 by the unconditional call forwarding function that has been enabled for the main dialing number on the subscriber's line.

Instead, service platform 312 alters signaling information for the call such that the alternative dialing number is substituted in place of the main dialing number as the call destination for the call. Thus, when service platform 312 routes the call back to local telephone exchange switch 318 with the alternative dialing number as the call destination address, local telephone exchange switch 318 will present the call to the subscriber's line, and it will not be re-directed, so that the call may be received at the appropriate subscriber equipment, i.e. telephone 300. Note that, with some teen line implementations on the alternative dialing number for a telephone line, this will cause the subscriber's telephone to ring with a distinctive ringing pattern. This signifies to the subscriber that the call has been handled by service platform 312 according to the settings and rules associated with that subscriber, in this particular case that those settings/rules indicated that the call should be presented to the subscriber's own line via the alternative dialing number.

A provisioning node 328 is also depicted in FIG. 3 connected to service platform 312 and local telephone exchange switch 318. Provisioning node 328 is a network node responsible for the provisioning of services at both service platform 312 and local telephone exchange switch 318 and is under the control of one or more relevant service providers. Such provisioning may involve initiating a new service for a subscriber on service platform 312 after they upgrade their telephony services package. Conversely, such provisioning may involve removing an existing service for a subscriber on service platform 312 after they terminate or downgrade their telephony services package.

Such provisioning may also involve changing one or more settings in response to input by a subscriber via an interface on service platform 312 or local telephone exchange switch 318. Provisioning node 328 is able to analyze the various services being provided by service platform 312 and local telephone exchange switch 318 and transmits appropriate commands to service platform 312 and local telephone exchange switch 318 in order to provide the appropriate services and configure them with the correct settings, etc. Provisioning node 328 is also able to detect when a particular service or service setting might cause interoperability problems and can configure the service and/or setting to avoid such problems occurring. This might involve barring a subscriber from using a particular service, or configuring a particular setting of that service, for example by preventing the subscriber from being able to configure such via interfaces on service platform 312 and/or local telephone exchange switch 318.

Provisioning node 328 is also responsible for migrating services previously provided by local telephone exchange switch 318 over to service platform 312, for example when a user gains access to advanced services which are only provided by service platform 312, in which case non-advanced services can be migrated over to service platform 312 instead of being provided by local telephone exchange switch 318 to avoid interoperability problems. This also allows a subscriber to configure all their services via a single, unified interface on service platform 312.

Software running on and/or hardware incorporated into provisioning node 328 can be suitably programmed by a service provider or customer services representative to carry out provisioning of service platform 312 and local telephone exchange switch 318. Such programming may be carried out via a web interface (not shown) or another type of remote interface by which new and existing services and appropriate service provisioning commands can be set up.

Embodiments of the present invention relate to efficiently using dialing numbers which are a limited resource at local telephone exchange switch 318. Not all telephone lines which are served by local telephone exchange switch 318 will be subscribers to advanced telephony services. It would therefore be inefficient to treat all users served by local telephone exchange switch 318 in a similar manner. Instead, subscribers to advanced telephony services can be allocated main and alternative dialing numbers on their telephone lines, whereas non-subscriber will only be allocated a main dialing number for their telephone lines. Services for non-advanced users can be triggered at local telephone exchange 318, whereas services for advanced users can be triggered at service platform 312.

Services for users of non-advanced services such as voicemail or selective call forwarding services can be triggered at local telephone exchange switch 318. Incoming calls to such non-advanced services users can be directed to subscriber equipment, for example telephone 300, using their main dialing number.

Incoming calls to the main dialing number for advanced services subscribers are forwarded to service platform 312 where non-advanced services subscribers such as voicemail or selective call forwarding services and also advanced services can be provided according to subscriber settings associated with each subscriber. Advanced services may include call rejection services, selective call rejection services, selective call acceptance services, call screening services, incoming call notification services, simultaneous ring services, find me/follow me services, customized ringback tone services, etc.

Migration of the provision of both advanced and non-advanced services over to service platform 312 may thus be achieved for advanced service subscribers, whereas provision of non-advanced services will remain under the control of local telephone exchange switch 318 for non-advanced service users. The present invention thus provides more efficient use of telephone dialing numbers, where additional alternate dialing numbers are allocated only when required for advanced telephony service subscribers.

In embodiments of the present invention, a subscriber could use just their main dialing number and advertise this number to all their contacts as the dialing number they wish to be contacted on.

In the embodiment of the present invention depicted in FIG. 3, service platform 312 is connected to local telephone exchange switch 318 via an STP 308 along an SS7 signaling connection. In alternative embodiments of the present invention, service platform 312 is connected to local telephone exchange switch 318 via a Primary Rate Interface (PRI), intelligent peripheral node 316 is collocated with service platform 312, and service platform 312 and intelligent peripheral node 316 share the PRI link to local telephone exchange switch 318.

Figure 4:
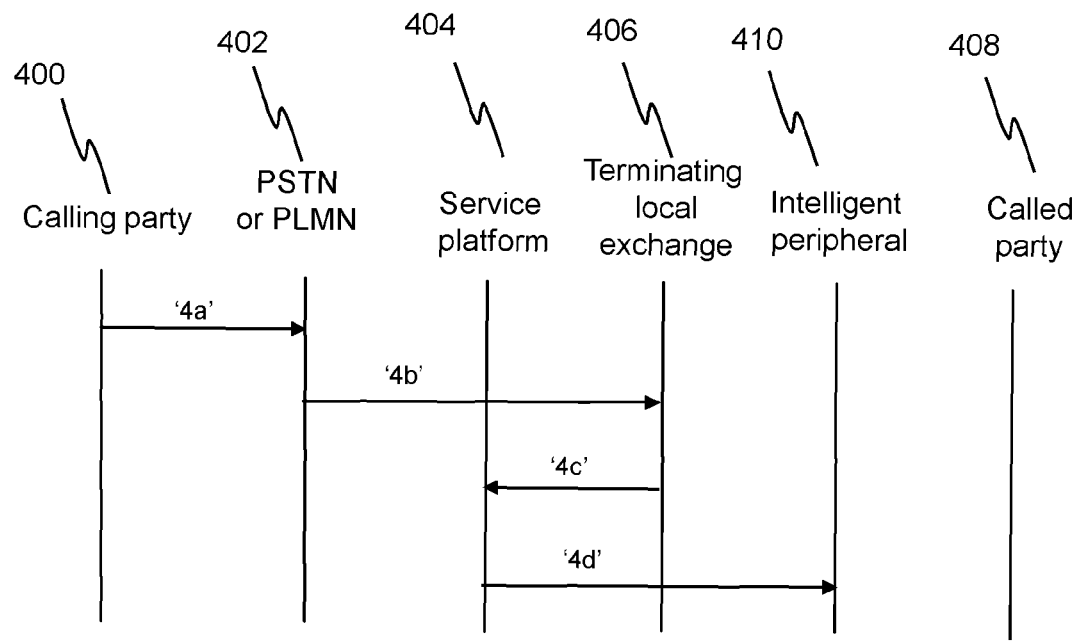
FIG. 4 is a signaling flow diagram showing a call processing procedure according to an embodiment of the present invention.

FIG. 4 is a signaling flow diagram showing a call processing procedure according to an embodiment of the present invention. This embodiment involves advanced telephony services being applied to a terminating call.

When a calling party 400 wishes to make a call to a called party 408, signaling information for the call is received in Public Switched Telephone Network (PSTN) or Public Land Mobile Network (PLMN) 402 which serves calling party 400, as shown by step 4a.

The call is then routed in step 4b to terminating local telephone exchange 406 using techniques known to one skilled in the art, for example using a Local Number Portability (LNP) mechanism. Terminating local telephone exchange 406 has been configured to forward incoming calls to the telephone dialing number to which the call is directed to service platform 404 and does so accordingly in step 4c.

Service platform 404 now determines which subscriber the call is directed to and how the call should be treated by accessing a database (for example database 320) and searching for entries corresponding to the telephone dialing number to which the call is directed. In this case, a subscriber is identified and the settings associated with that subscriber dictate that an advanced service is to be applied to the call, so that the call is routed to intelligent peripheral 410 where the advanced service is provided, see step 4d.

In this embodiment, the subscriber settings indicate that the call should be terminated once intelligent peripheral 410 has applied an advanced telephony service to the call without the call being delivered to called party 408. The call can be released by intelligent peripheral 410 after an advanced telephony service has been applied to the call, or alternatively the call can be routed back to service platform 404 which may then release the call itself.

Figure 5:
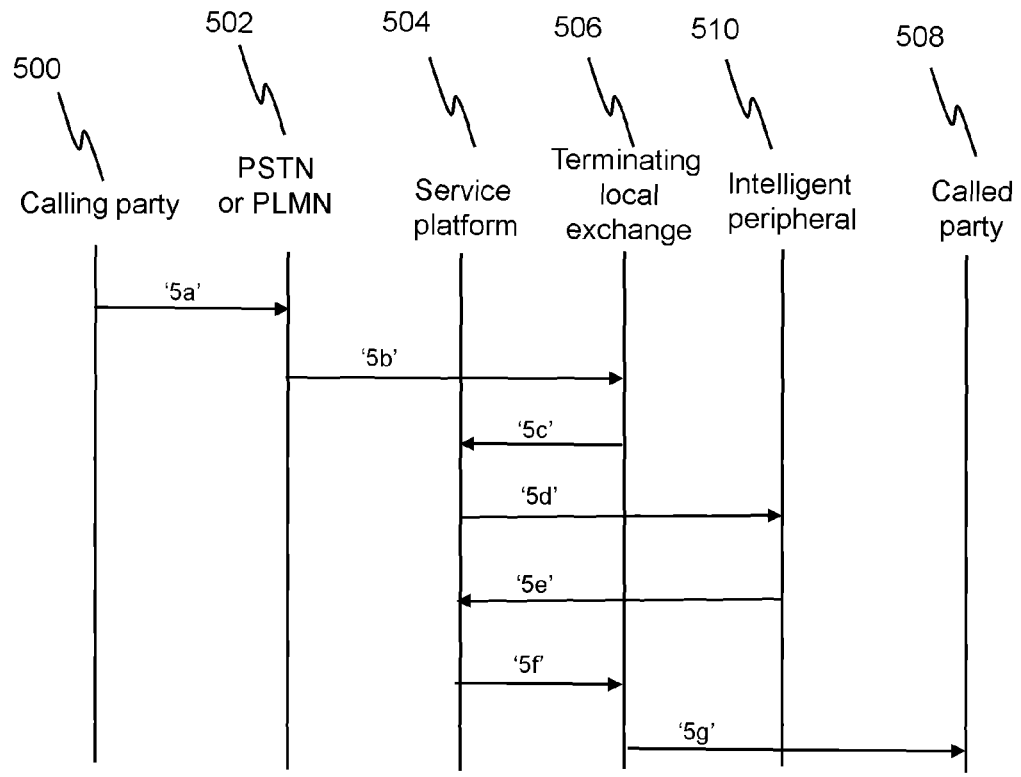
FIG. 5 is a signaling flow diagram showing a call processing procedure according to an embodiment of the present invention.

FIG. 5 is a signaling flow diagram showing a call processing procedure according to an embodiment of the present invention. This embodiment involves an advanced telephony service being applied to the call the call subsequently being directed to subscriber equipment associated with a called party subscriber via their alternate dialing number.

When a calling party 500 makes a call to a called party 508, signaling information for the call is received in Public Switched Telephone Network (PSTN) or Public Land Mobile Network (PLMN) 502 which serves calling party 500, as shown by step 5a. The call is then routed in step 5b to terminating local telephone exchange 506 using techniques known to one skilled in the art, for example using the Local Number Portability (LNP) mechanism. Terminating local telephone exchange 506 has been configured to forward incoming calls to the telephone dialing number to which the call is directed to service platform 504 and does so accordingly in step 5c.

Service platform 504 now determines which subscriber the call is directed to and how the call should be treated by accessing a database (for example database 320 in FIG. 3) and searching for entries corresponding to the telephone dialing number to which the call is directed. In this case, a subscriber is identified and the settings associated with that subscriber dictate that an advanced service is to be applied to the call, so that the call is routed to intelligent peripheral 510 where an advanced service is provided to the call, see step 5d.

In this example, the relevant subscriber settings indicate that the call should be presented to the called party after an advanced telephony service has been provided by intelligent peripheral 510. Intelligent peripheral 510 thus forwards the call back to service platform 504 in step 5e. Service platform 504 identifies the alternative dialing number associated with the subscriber (for example by accessing store 320 in FIG. 3) and substitutes the main dialing number in the call destination field of the call with the alternative dialing number for the subscriber.

Service platform 504 then forwards the call back to terminating local telephone exchange switch 506 in step 5f. As the call is directed to the alternate dialing number for which unconditional call forwarding is not enabled, terminating local telephone exchange switch 506 delivers the call to the subscriber equipment of called party 508 accordingly in step 5g. If the alternate dialing number is a teen line service, the called party's telephone will typically ring with a different ringing pattern to standard telephone calls, which indicates to the called party that the call has been processed according to their associated subscriber settings.

In an alternative embodiment of the present invention, service platform 504 substitutes the main dialing number in the call destination field of the call with the alternative dialing number in combination with step 5d. After an advanced telephony service has been applied to the call, intelligent peripheral 510 forwards the call direct to terminating local telephone exchange switch 506 without service platform 504 being further involved in the call.

In a further alternative embodiment of the present invention, service platform 504 provides an advanced telephony service to the call itself without the need for the call to be forwarded to intelligent peripheral 510 and back again to the service platform.

Figure 6:
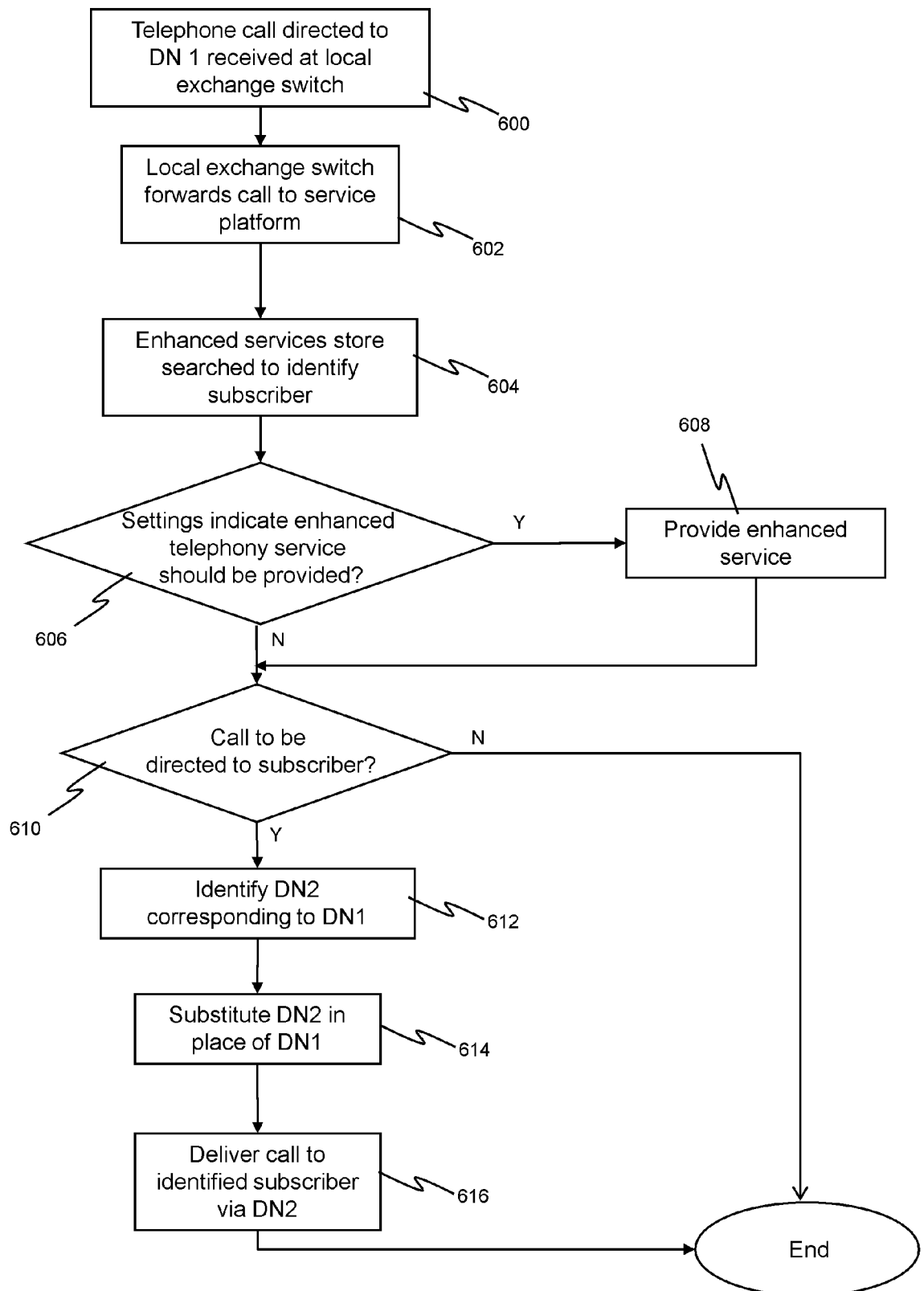
FIG. 6 is a flow chart showing call processing steps according to an embodiment of the present invention.

FIG. 6 is a flow chart showing call processing steps according to an embodiment of the present invention. The call is directed to a telephone line that has been assigned both a main telephone dialing number (denoted 'DN1' in FIG. 6) and an alternative telephone dialing number (denoted 'DN2' in FIG. 6); in this example embodiment, the call is directed to the main telephone dialing number of the line.

The process begins when the telephone call directed to DN1 is received at a terminating local telephone exchange switch (such as local telephone exchange switch 318 in FIG. 3) located in a telecommunications network in step 600. The terminating local telephone exchange switch is configured to forward calls directed to DN1 to a service platform (such as 312 in FIG. 3) responsible for processing calls for advanced telephony service users, see step 602. In step 604, the service platform searches a store (such as store 320 in FIG. 3) in order to determine which subscriber the call relates to and any associated subscriber settings dictating how the call should be processed.

If the associated settings indicate, see step 606, that an advanced service should be applied to the call, the service platform forwards the call to an intelligent peripheral (such as 316 in FIG. 3) where advanced services can be provided, see step 608.

In step 610 the associated subscriber settings are processed to see if they indicate that the call should be directed to the subscriber's telephone. If the call was routed back to the local telephone exchange switch with a call destination corresponding to the main telephone dialing number for the subscriber's line, the local telephone exchange switch would forward the call back to the service platform once more due to the unconditional call forwarding enabled for the main telephone dialing number.

To avoid this scenario, the service platform accesses the store to identify the alternative telephone dialing number DN2 associated with the subscriber's telephone line in step 612. The service platform then substitutes DN2 in place of DN1 in signaling information for the call, see step 614, and forwards the call back to the terminating local telephone exchange switch. As the terminating local telephone exchange switch is not configured to forward calls to DN2 to the service platform, the call is directed to subscriber equipment associated with the subscriber using DN2, see step 616.

Figure 7:
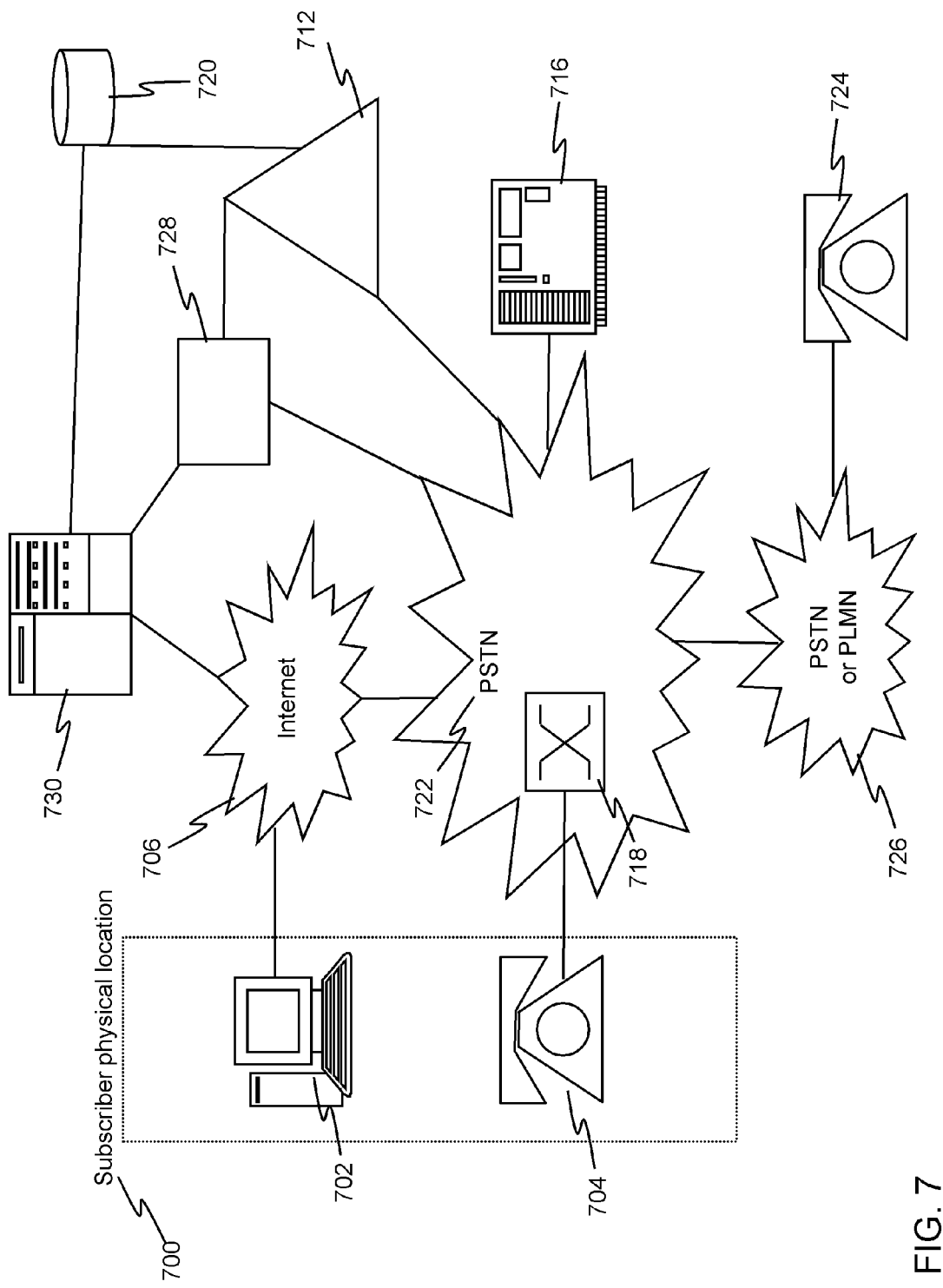
FIG. 7 is a diagram showing a telecommunications network according to embodiments of the present invention.

FIG. 7 is a diagram showing a telecommunications network according to embodiments of the present invention. This embodiment includes 'click-to-dial' functionality where an outgoing call from a subscriber's telephone may be made by a subscriber in response to subscriber input on a data processing device separate to their telephone. The subscriber telephone may be an analogue telephone. The data processing device may be a personal computer or other such computing device and the subscriber input may be a press of a keyboard key or click of a mouse button via a graphical user interface running on the data processing device. Various STPs have been omitted in FIG. 7 for the sake of clarity, but in reality would be present, their function and connection configuration being clear to one skilled in the art.

FIG. 7 shows subscriber equipment 700 being located on the subscriber's premises. The subscriber equipment includes a personal computer 702 connected to the public Internet 706, and a telephone 704 connected to PSTN 722. A service platform 712 connected to PSTN 722 and Internet 706 is responsible for controlling the provision of services to subscribers. Service platform 712 has access to a database 720 containing subscriber settings. Such subscriber settings may include preferences associated with each subscriber, such as how they would like their advanced telephony services configured.

The subscriber settings in database 720 may be customized by subscribers via a web server 730 which is connected to Internet 706 and/or directly to service platform 712. Web server 730 may also provide a service management system role so that a service provider administrator or customer services representative may modify a service configuration.

Click-to-dial services are provided to a subscriber having subscriber equipment 702 and 704. Subscriber telephone 704 is served by local telephone exchange switch 718. In this case, the subscriber wishes to make an outgoing call to a called party telephone 724 which is served by PSTN or PLMN 726.

The subscriber has a main dialing number and an alternate dialing number associated with a local telephone exchange switch 718, details of which are stored in database 720. Local telephone exchange switch 718 is configured to forward incoming calls directed to the main dialing number of the subscriber to service platform 712 which is responsible for controlling advanced telephony services for the subscriber.

Note that although service platform 712, database 720 and intelligent peripheral 716 are depicted as being located externally to Internet 706 and PSTN 722, they may in reality be part of the Internet 706 and/or PSTN 722.

A provisioning node 728 is also depicted in FIG. 7 connected to service platform 712, PSTN 722 and web server 730. Provisioning node 728 is a network node responsible for the provisioning of services at service platform 712 and telephone switch 718. Provisioning node 728 operates in a similar to provisioning node 328 described above in relation to FIG. 3 and is similarly under the control of one or more relevant service providers. Provisioning node 728 can be suitably programmed by a service provider or customer services representative to carry out provisioning of service platform 312 and telephone switch 718 via web server 730 either through a direct connection or via internet 706 or PSTN 722 (not shown).

Figure 8:
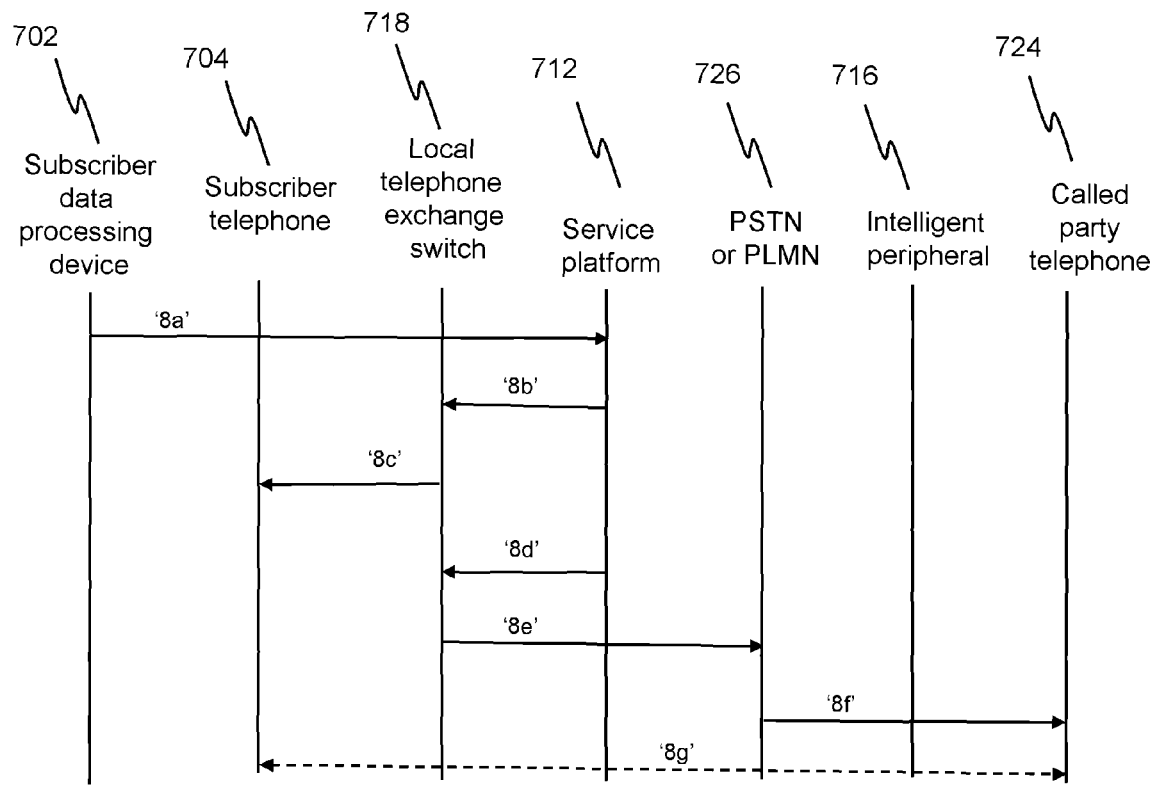
FIG. 8 is a signaling flow diagram showing a call processing procedure according to an embodiment of the present invention.

FIG. 8 is a signaling flow diagram showing a call processing procedure according to an embodiment of the present invention. This embodiment shows call flows for 'click-to-dial' functionality which may be implemented in the telecommunications network of FIG. 7.

When a subscriber, i.e. the calling party, wishes to make an outgoing call, in this case to called party telephone 724, the subscriber makes a suitable input on their data processing device 702. This causes an outgoing call request to be transmitted from data processing device 702 to service platform 712 in step 8a. The outgoing call request may be routed via Internet 706 and/or PSTN 722.

When the outgoing call request is received at service platform 712, service platform 712 accesses database 720 in order to determine the alternate dialing number for the subscriber. Service platform 712 then creates an incoming call to subscriber telephone 704 using the alternate dialing number in signaling information for the call. The main dialing number is not used in order to avoid the call being forwarded back to service platform 712 by the call forwarding configuration on local telephone exchange switch 718.

The incoming call is routed using the alternate dialing number for the subscriber to local telephone exchange switch 718 which serves subscriber telephone 704 in step 8b and originating local telephone exchange switch 718 directs the incoming call to subscriber telephone 704 in step 8c. An outgoing call is now created from service platform 712 via local telephone exchange switch 718 in step 8d, which is routed to PSTN or PLMN 726 in step 8e. PSTN or PLMN 726 then directs the call to called party telephone 724 in step 8f. The incoming and outgoing calls are then bridged together by service platform 712 in step 8g. A call path is thus established between subscriber telephone 704 and called party telephone 724 via the bridged connection at service platform 712.

The outgoing call be signaled using either the main or alternative dialing number for the subscriber as the calling party identifier. However, the outgoing call is preferably signaled using the main dialing number for the subscriber as the calling party identifier, so that the subscriber only needs to advertise a single dialing number and will thus tend to only receive calls on their main dialing number.

The click-to dial functionality described above can be used in conjunction with the provision of advanced telephony services via service platform 712 and intelligent peripheral 716.

A further embodiment of the invention allows a Teen Line service to be provided despite the main dialing number being employed for forwarding of calls to enable services to be applied at a service platform. To achieve this, a further alternate dialing number is employed in association with a telephone line, so that call forwarding to a service platform is carried out using a main dialing number, and subscribers may receive incoming calls via first and second alternate dialing numbers. This embodiment of the invention may be implemented using the entities depicted in FIG. 3.

The main, first alternative and second alternative dialing numbers are associated with a local telephone exchange switch which is configured to forward calls directed to the main dialing number of a subscriber to a service platform (such as service platform 312 shown in FIG. 3) responsible for controlling the provision of services for the subscriber.

Calls forwarded to the service platform may be directed back to the local exchange and on to the subscriber using the first alternate number, whereas calls to the second alternate number can be directed to the subscriber without going via the service platform.

Different sets of subscriber settings relating to services and service settings can be associated with the main dialing number and the second alternate number. For example, a first user in the household (for example a parent) may wish to have one set of settings for themselves which can be applied by the service platform, whereas a second user in the household (for example a teenager) may wish to have a different set of settings which can be applied by the local exchange.

In a still further embodiment of the invention, a third alternate dialing number can be used, so that calls for the second user can be forwarded to the service platform via the second alternate dialing number and settings for the second user can be applied at the service platform. If the settings for the second user so dictate, the call can be directed back to the local exchange and on to the subscriber telephone using the third alternate dialing number. Incoming calls associated with the first user may thus be treated differently by the service platform from incoming calls associated with the second user, according to different sets of customized settings. The subscriber settings may be configured by the first and second users via a remote interface with appropriate access to service platform 312 and/or store 320.

Calls for the first user may be presented to the subscriber equipment with a different ring-pattern, so that the first and second users can tell which calls are for them before answering the call.

Further alternative dialing numbers may be used to cater for further users in a household who wish to have further different settings for their calls.

Figure 9:
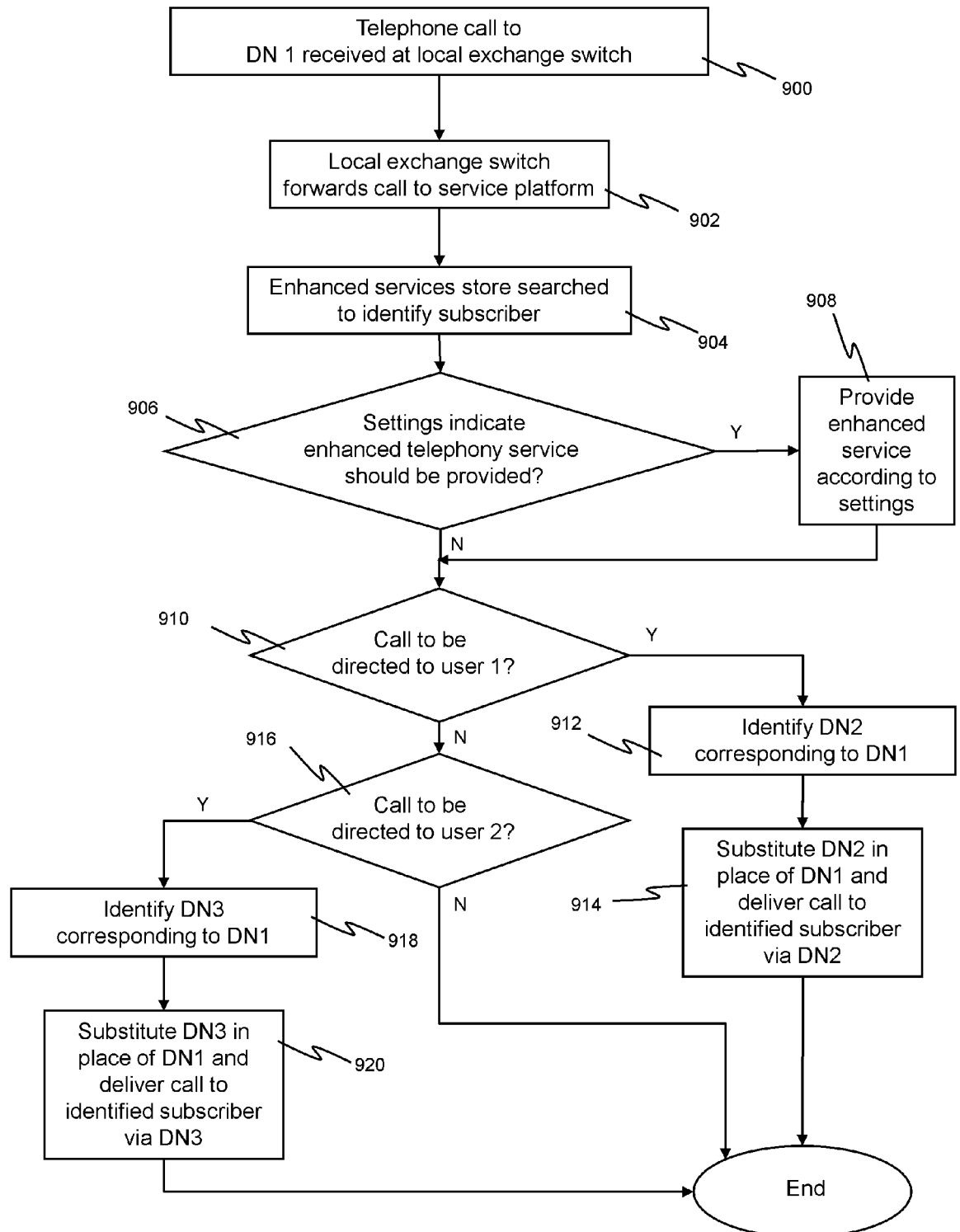
FIG. 9 is a flow chart showing call processing steps according to an embodiment of the present invention.

FIG. 9 is a flow chart showing call processing steps according to an embodiment of the present invention. This embodiment shows call flows for multiple alternative dialing number functionality which may be implemented in the telecommunications network of FIG. 7 (although subscriber equipment 702 or web server 730 are not required here).

The process begins in step 900 when an incoming telephone call to the main dialing number (DN1 in FIG. 9) for a subscriber is received at a local telephone exchange switch 718. Local telephone exchange switch 718 is configured to forward calls to DN1 to service platform 712, which it does so accordingly in step 902. Service platform 712 searches database 720 to identify the subscriber and associated settings in step 904. The settings for the identified subscriber are processed in step 906 to ascertain whether an advanced telephony service should be provided. If an advanced service is required according to the settings, then the appropriate advanced service is provided by intelligent peripheral 716 under the control of service platform 712, or by service platform 712 itself in step 908.

In step 910 it is determined whether the settings indicate that the call is to be directed to user 1 via the first alternate dialing number on telephone 704. If so, the settings are processed in step 912 to determine the first alternate dialing number (DN2 in FIG. 9) associated with user 1. In step 914, DN2 is substituted in place of DN1 in signaling information for the call and the call is delivered to subscriber telephone 704.

In step 916 it is determined whether the settings indicate that the call is to be directed to user 2 via the second alternate dialing number on telephone 704. If so, the settings are processed in step 918 to determine the second alternate dialing number (DN3 in FIG. 9) associated with user 1. In step 920, DN3 is substituted in place of DN1 in signaling information for the call and the call is delivered to subscriber telephone 704.

Embodiments of the invention tackle the problem of interoperability between services provided by different service providers, for example between services provided at a local telephone exchange switch and services provided at a service platform separate to the local telephone exchange switch. Interoperability problems can occur when a service, or a setting of a service provided by one service provider in relation to incoming calls directed to a main dialing number for a subscriber, interferes with or behaves in an unexpected or undesired way in conjunction with a different service, or setting of a service provided to that subscriber by the same or a different service provider. To avoid this scenario, for a first subscriber who requires services of the first type and also services of the second type, provision of both types of services can be migrated over to the service platform and various settings of those services set accordingly on the service platform. The local exchange is reconfigured for the first subscriber, which restricts subscriber-configurability for one or more services of the first type on the local exchange.

One subscriber-configurability feature which may be enabled on the local exchange prior to its reconfiguration for the first subscriber is a feature allowing a subscriber to activate or deactivate a service on the local exchange. Another such subscriber-configurability feature is a feature allowing a subscriber to alter a service setting on the local exchange. Such features can be disabled on the local exchange to avoid interoperability problems either by switching off a service, removing the service from the subscriber's available services, or by locking a setting for the service. Thus, a subscriber can be prevented from being able to activate or deactivate certain services or choose certain settings which may interfere with services provided by the service platform.

If a local exchange provides services of a first type in relation to incoming calls to a subscriber on their main dialing number, the services of the first type and settings of those services may be configurable by a subscriber on the local exchange. However, a subscriber may also wish to use services of a second type in relation to incoming calls on their main dialing number which are not supported by the local exchange.

According to embodiments of the invention, a call forwarding function is configured at a local exchange to forward incoming calls directed to a main dialing number for a first subscriber to a service platform which is separate from the local exchange. For the first subscriber, services of the second type can be triggered at the service platform for at least some incoming calls forwarded to the service platform by the call forwarding function. Some calls for the first subscriber can be forwarded from the service platform back to the local exchange using an alternate dialing number for the first subscriber and then directed to subscriber equipment associated with the first subscriber. The local exchange can be reconfigured to disable a subscriber-configurability feature on the local exchange for a service of the first service type, for the main dialing number for the first subscriber.

For the first subscriber, services of the first type can also be triggered at the service platform for at least some incoming calls forwarded to the service platform by the call forwarding function. For the first subscriber, services of the first type as well as services of the second type can be subscriber-configurable via a first user interface associated with the service platform. By deactivating subscriber-configurability of services of the first type on the local exchange for the first subscriber and instead allowing the first subscriber to configure services of the first type on the service platform, interoperability of the services of the different types can be monitored and controlled at the service platform and action to avoid any interoperability problems that otherwise might have occurred can be undertaken. Further, the first subscriber can also configure services of the second type via the same interface on the service platform thus providing more unified and user-friendly services.

Embodiments of the invention may include deactivating services of the first service type or settings of those services at the local exchange for the first subscriber. Services of the first type and settings of those services can be configured on the service platform and their subscriber-configurability can be controlled in conjunction with subscriber-configurability of services of the second type, thus interoperability problems between the two types of service and any conflicting services settings can be avoided.

For a second subscriber who only requires use of services of the first type, no call forwarding from the local exchange to the service platform is carried out on calls directed to the main dialing number for the second subscriber. The second subscriber is able to configure their services (of the first type only) and settings of those services via an interface on the local exchange.

In embodiments of the invention, the second subscriber is able to configure services of the first type provided by the local exchange via an interface on the local exchange such as a DTMF or web interface, or by speaking to a customer services representative who then configures the services on behalf of the subscriber.

Similarly, the first subscriber is able to configure services of both the first type and the second type provided by the service platform via an interface on the local exchange such as a DTMF interface, a web interface, or by speaking to a customer services representative who then configures the services on behalf of the subscriber.

Embodiments of the invention avoid use of multiple subscriber interfaces by a subscriber depending on which service the subscriber wishes to configure by providing a single interface to a subscriber for all services that the subscriber uses on the service platform.

Embodiments of the invention also avoid interoperability and configuration problems by providing the ability to disable one or more subscriber-configurability features on the local exchange. This might for example involve turning off a service previously provided by the local exchange and providing the service via the service platform instead. In this case, the subscriber-configurability is the ability for a subscriber to turn a service on or off. The subscriber can also configure settings for that service via a unified interface on the service platform.

In the case of a selective call forwarding service, a subscriber may wish to turn the selective call forwarding service on when they move from a certain location and turn it back on again when they move to another location. A subscriber can also configure settings for services, for example with a selective call forwarding service that allows a call forwarding number to be altered, a subscriber may wish to change the setting of the call forwarding number to forward to a different number.

If such a subscriber wishes to also use a service of the second type, then this service may only be provided by the service platform and this could lead to interoperability problems between the services provided on the local exchange and the services provided on the service platform.

For example, a subscriber might configure a setting on a selective call forwarding service provided by the local exchange for forwarding calls from a first number to a second number, and also might configure a setting on a selective call forwarding service provided by the service platform for forwarding calls from a third number to a fourth number. The two selective call forwarding services provided by the local exchange and the service platform respectively may then behave in a way which is not expected or desired by the subscriber.

Instead, according to embodiments of the invention, when such a subscriber enables a selective call forwarding service provided by the service platform or changes a setting on a selective call forwarding service provided by the service platform, subscriber-configurability of the corresponding setting is disabled on the selective call forwarding service on the local exchange. This means that the subscriber is prevented from configuring the selective call forwarding service on the local exchange in a manner which might interfere with the correct functioning of the selective call forwarding service on the service platform. Alternatively, or in addition, the selective call forwarding service on the local exchange can be disabled entirely and the subscriber can be prevented from enabling the selective call forwarding service on the local exchange, in which case the subscriber may only subsequently use and configure the selective call forwarding service on the service platform.

Subscriber-configurability of an unconditional call forwarding service can be disabled on the local exchange for a subscriber who requires services which are not supported by the local exchange. The unconditional call forwarding service on the local exchange can then be configured by the service provider to forward calls to the service platform where the calls can be processed according to subscriber-configurable settings associated with the services provided by the service platform. To avoid the loss of a subscriber-configurable unconditional call forwarding service for that subscriber, an unconditional call forwarding service can be provided via the service platform including support of subscriber-configurability via the service platform.

As unconditional call forwarding has been disabled on the local exchange for that subscriber, interworking problems can be avoided between the unconditional call forwarding service provided by the local exchange and the unconditional call forwarding service provided by the service platform. If a subscriber attempts to configure an unconditional call forwarding service which has been disabled on the local exchange, for example using DTMF tones on the local exchange interface, then such action will be prevented due to the disablement. The subscriber can be suitably informed that such a request will not be successful via an announcement on their phone, or a message on the service platform interface.

The disablement of a setting on a service provided by the local exchange may occur in response to a subscriber acquiring access to a service or a service with a particular setting on the service platform. For example, a subscriber may be provided with an enhanced voicemail service via the service platform and an existing standard voicemail service provided via the local exchange may be switched-off, i.e. disabled. Instead of disabling the existing standard voicemail service on the local exchange entirely, one or more settings on the existing standard voicemail service might be disabled or modified so that an operation on the part of the existing standard voicemail service that might have interfered with the enhanced voicemail service can never be triggered.

For example, a subscriber-configurable setting may be a setting which allows the number of rings before voicemail is triggered to be altered, and the subscriber is able to configure the number of rings to a different setting such as three rings instead of four. If such a subscriber is also provided with a voicemail service (such as an enhanced voicemail service with additional functionality not provided by the non-enhanced voicemail service) on the service platform, and sets the number of rings before the voicemail service on the service platform is triggered to two, then the resulting operation of the two voicemail services may not be what the subscriber actually wanted. According to embodiments of the invention, the voicemail service on the local exchange is disabled entirely. Alternatively or in combination, the subscriber configurability of the number of rings before triggering of a voicemail function for the voicemail service on the local exchange is disabled, so that the subscriber may only configure the number of rings before triggering of the voicemail service on the service platform.

Disablement of a service or setting on the local exchange may occur when a subscriber turns on a service provided by the service platform via the service platform interface. Disablement of a service or setting on the local exchange may also occur in response to a request for a new service or service setting by an administrator on behalf of the subscriber, via a control interface such as a customer service representative interface or service provider administrator interface.

For example, a subscriber may call customer services and request that their standard voicemail service provided by the local exchange is upgraded to an enhanced voicemail service which is only supported by the service platform. In response to such a request, a customer services representative can arrange for call forwarding from the local exchange to the service platform to be configured, the enhanced voicemail service to be enabled on the service platform and the standard voicemail service on the local exchange to be disabled. Alternatively, call forwarding from the local exchange to the service platform may be configured, the enhanced voicemail service may be enabled on the service platform and any settings of the standard voicemail service which might interfere with the enhanced voicemail service can be disabled on the local exchange.

Interoperability problems may occur between different services as well as between similar services provided by a local exchange and a service platform. Similar services may for example include a voicemail service provided by the local exchange and an enhanced voicemail service provided by the service platform, whereas different services may include a call forwarding service provided by the local exchange and a call restriction service provided on the service platform. In the latter case of different services, interoperability problems may occur when a setting for a call forwarding service provided by the local exchange means that an incoming call would be forwarded from the local exchange to voicemail, but that a setting on a call restriction service provided by the service platform means that an incoming call to that number should be dropped immediately without being sent to voicemail. In embodiments of the invention, such interoperability problems can be avoided by disabling the ability for the subscriber to configure call forwarding to voicemail on the local exchange and instead allowing the subscriber to configure call forwarding to voicemail on the service platform. In addition, either the ability for the subscriber to be able to configure call forwarding to voicemail on certain incoming calls will be disabled on the service platform, or the ability for the subscriber to be able to configure a call restriction service on those calls will be disabled. When attempting to configure their services on the service platform where such services may interfere with each other, the subscriber can be notified via a user interface on the service platform that such configurations have been barred and that alternative settings must be chosen. The subscriber can then choose to reconfigure their services accordingly in a different manner.

Similarly, if a subscriber attempts to change any settings on the local exchange which might lead to interoperability problems, they can be suitably informed via an announcement through their telephone or a message through a web interface that such an operation is not allowed. The subscriber may be further informed that a suitable and/or equivalent operation may be carried out via the interface on the service platform or by contacting customer services, etc.

Provisioning of the various services including enabling and disabling services on a local exchange and a service platform, migrating services over from a local exchange to a service platform, deactivating of certain services, barring of certain service settings, etc., can be carried out under the control of a provisioning node such as that depicted in FIG. 3 (item 328) and FIG. 7 (item 728). Such a provisioning node has communication links to the various local exchanges and service platforms and can transmit appropriate commands which will cause them to provide services configured accordingly. Such a provisioning node can be suitably programmed by a service provider or customer services representative directly or via a network connection.

Figure 10:
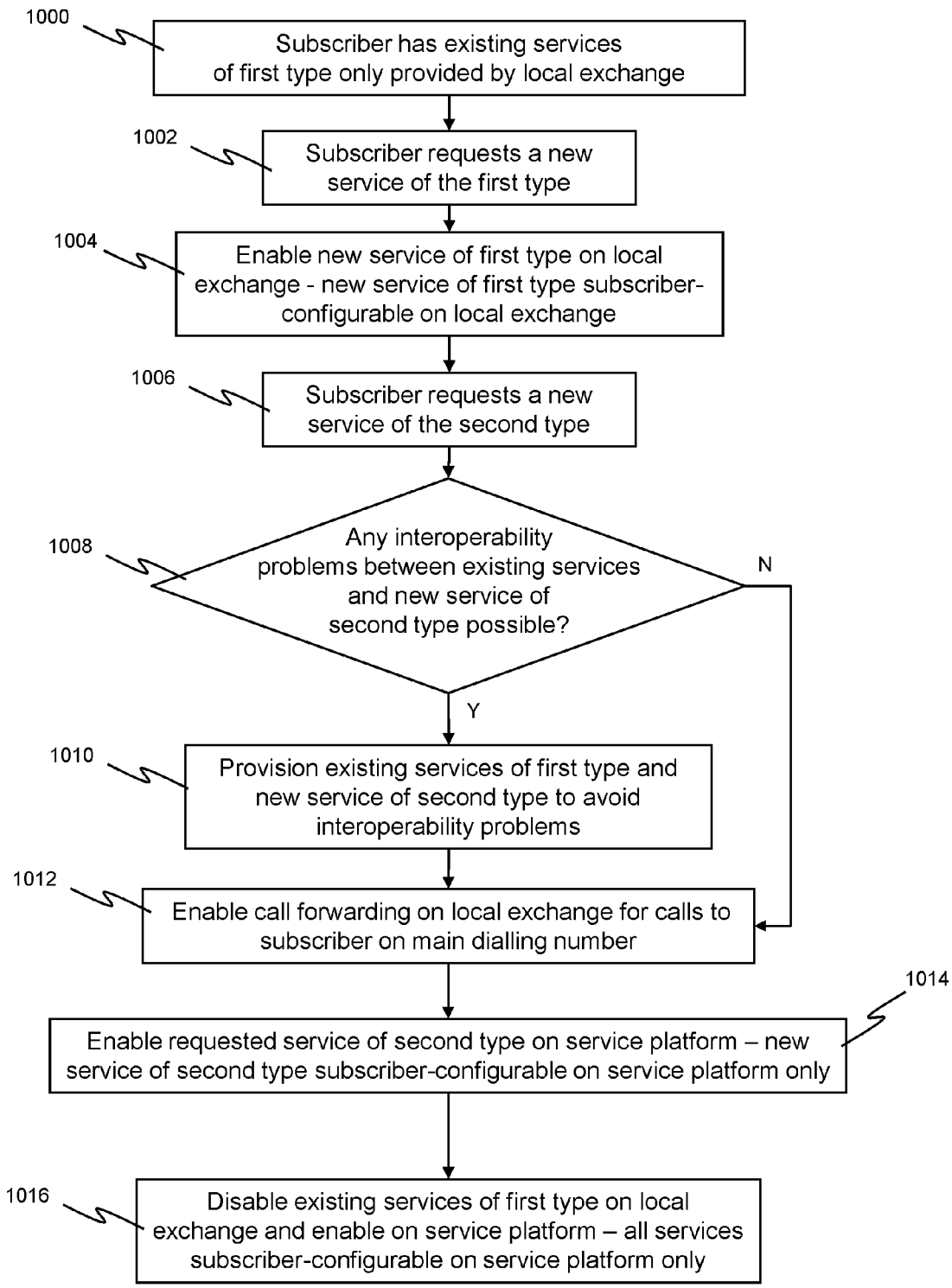
FIG. 10 is a flow chart showing service provisioning steps according to an embodiment of the present invention.

FIG. 10 is a flow chart showing service provisioning steps according to an embodiment of the present invention.

Initially, a subscriber only has existing services of the first type provided by a local exchange which supports services of the first type, as per step 1000. The subscriber then requests a new service of the first type in step 1002. The new service may for example be requested from a service provider by contacting a customer services representative or via an interface on the local exchange. The new service of the first type is also supported by the local exchange and is enabled on the local exchange accordingly in step 1004. The service enablement of step 1004 may occur in response to receipt of one or more appropriate commands from a provisioning node such as provisioning node 328 described above in relation to FIG. 3. The subscriber may configure their new service of the first type via an interface on the local exchange.

The subscriber now requests a new service of the second type in step 1006. The new service may for example be requested from a service provider by contacting a customer services representative or via an interface on the local exchange or via a service platform separate from the exchange. The new service of the second type is not supported by the local exchange, so cannot be enabled on the local exchange. However, the new service of the second type is supported by the service platform separate from the local exchange. The service provider responsible for operating the service platform and/or a provisioning node now checks in step 1008 if any interoperability problems may occur between the subscriber's existing services of the first type and the new service of the second type.

If any interoperability problems may occur, then the service provider responsible for operating the service platform provisions the service accordingly in step 1010. Such provisioning may be carried out in response to one or more commands received by the provisioning node.

The provisioning process involves identifying which services might interfere with each other, which settings of the services might interfere with each other and taking preventative action to avoid such problems. For example, a service may be deactivated completely on the local exchange and instead provided on the service platform, or a setting of a service which might interfere with another service might be removed from that service. As another example, subscriber-configurability for a potentially interfering service on the local exchange can be disabled, including subscriber-configurability of one or more settings on the local exchange. This could include preventing a subscriber from being able to switch a service on the local exchange if it has been deactivated. Such provisioning can be calculated and implemented by a provisioning node (such as provisioning node 328 depicted in FIG. 3 or provisioning node 728 depicted in FIG. 7) which can send appropriate commands to the local exchange and service platform in order that the services they provide are configured to be free of interoperability problems.

Once provisioning of the services has been carried out, call forwarding is enabled, for example in response to receipt of one or more appropriate commands from a provisioning node, on the local exchange for calls to the subscriber on their main dialing number in step 1012. The subscriber is allocated an alternate dialing number, for example in response to receipt of one or more appropriate commands from a provisioning node, which is used to direct calls back to the subscriber's subscriber equipment in a similar manner to that described in other embodiments of the invention described above.

If no provisioning of the existing and new service is required, step 1010 can be skipped.

The newly requested service of the second type is now enabled on the service platform in step 1014, for example in response to receipt of one or more appropriate commands from a provisioning node. The subscriber is able to configure the new service of the second type via an interface on the service platform.

A provisioning node now arranges for the existing services of the first type to migrate from the local exchange over to the service platform in step 1016, for example by transmitting one or more appropriate commands to the local exchange and/or service platform. This involves disabling the services on the local exchange and/or disabling subscriber-configurability of the services on the local exchange and instead enabling those services and/or settings on the service platform. The existing services which have been migrated over to the service platform are then subscriber-configurable via an interface on the service platform instead of via the local exchange.

The above embodiments are to be understood as illustrative examples. Further embodiments of the invention are envisaged.

For example the functions of node 312 and 316 may be combined into a single node in the network. This may involve enhancing an existing service platform to add the necessary functionality for providing advanced telephony services when calls to and from such advanced telephony service subscribers are identified.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

What is claimed is:

1. A method of providing services to a plurality of subscribers in a telecommunications network, the subscribers each having subscriber equipment, a main dialing number and a local exchange with which each of the main dialing numbers is associated, the services being of different types including a first service type and a second service type, each of the services of the first service type being supported by and having one or more subscriber configurability features on the local exchange and each of the services of the second service type not being supported by the local exchange, comprising:

setting a call forwarding function at the local exchange for incoming calls directed to a main dialing number for a first subscriber, the call forwarding function, when set, forwarding the calls to a service platform separate from the local exchange;

triggering a first service of the second service type at the service platform for at least some incoming calls forwarded to the service platform by the call forwarding function;

forwarding at least some incoming calls from the service platform using an alternate dialing number for the first subscriber back to the local exchange;

directing incoming calls using the alternate dialing number for the first subscriber from the local exchange to the subscriber equipment for the first subscriber; and reconfiguring the local exchange for the first subscriber, the reconfiguring disabling a subscriber-configurability feature on the local exchange for a first service of the first service type, for the main dialing number for the first subscriber, wherein the reconfiguring is carried out in response to detecting that a particular service or service setting is capable of causing interoperability problems between the local exchange and the service platform.

2. The method of claim 1, further comprising triggering the first service of the first service type at the service platform for at least some incoming calls forwarded to the service platform by the call forwarding function.

3. The method of claim 2, wherein the first service of the first service type is subscriber-configurable on the service platform by the first subscriber via a first user interface associated with the service platform.

4. The method of claim 3, wherein the first service of the second service type is subscriber-configurable on the service platform by the first subscriber via the first user interface.

5. The method of claim 1, wherein a second subscriber, not having a call forwarding function configured at the local exchange for forwarding incoming calls directed to a main dialing number for the second subscriber to the service platform, has the subscriber configurability feature enabled on the local exchange for the first service of the first service type, for the main dialing number for the second subscriber.

6. The method of claim 3, wherein the first service of the first service type is subscriber-configurable by the second subscriber via a second, different, user interface associated with the local exchange.

7. The method of claim 1, wherein the reconfiguring comprises deactivating the first service of the first service type at the local exchange for the first subscriber.

8. The method of claim 1, wherein the first service of the first service type comprises a voicemail service.

9. A method according to claim 1, wherein the first service of the first service type comprises a selective call forwarding service.

10. The method of claim 1, wherein the first service of the first service type comprises an unconditional call forwarding service.

11. The method of claim 10, wherein setting the call forwarding function comprises setting an unconditional call forwarding service on the local exchange for the first subscriber and the reconfiguring comprises deactivating subscriber-configurability of the unconditional call forwarding service for the first subscriber on the local exchange.

12. The method of claim 1, wherein the first service of the second service type comprises at least one or more of:
a call rejection service,
a selective call rejection service,
a selective call acceptance service,
a call screening service,
an incoming call notification service,
a simultaneous ring service,
a find me/follow me service, or
a customized ringback tones service.

13. The method of claim 1, further comprising determining, at the service platform, for a given incoming call, whether to trigger the first service at the service platform, trigger the second service at the service platform, and/or forward the given incoming call from the service platform using the alternate dialing number, in dependence on one or more subscriber configurable settings on the service platform.

14. The method of claim 1, wherein the reconfiguring is conducted in association with the setting of the call forwarding function for the first subscriber.

15. A method of providing services to subscribers in a telecommunications network, the subscribers each having subscriber equipment, a main dialing number and a given local exchange with which each main dialing number is associated, comprising:
receiving an outgoing call request from first subscriber equipment associated with the subscriber;
in response to receipt of the outgoing call request, creating an incoming call using an alternate dialing number for the subscriber, the created incoming call being directed towards subscriber equipment associated with the subscriber by the local exchange;
creating an outgoing call according to the outgoing call request; and
bridging the created incoming call and the created outgoing call.

16. The method of claim 15, further comprising setting a local exchange to forward incoming calls directed to the main dialing number of a subscriber to a service platform separate from the local exchange, and triggering one or more services for at least some incoming calls for the subscriber at the service platform.

17. The method of claim 15, wherein the outgoing call request is initiated in response to input from the subscriber via a click-to-dial graphical user interface.

18. The method of claim 15, wherein the outgoing call is created using the main dialing number as a calling party identifier.

19. A method of providing services to subscribers in a telecommunications network, the subscribers each having subscriber equipment, a main dialing number and a given local exchange with which each of the main dialing numbers is associated, comprising:
setting a local exchange to forward incoming calls directed to the main dialing number of a subscriber to a service platform separate from the local exchange;
triggering one or more services for at least some incoming calls for the subscriber at the service platform;
forwarding at least some incoming calls from the service platform using a first alternate dialing number for the subscriber back to the local exchange;
forwarding at least some incoming calls from the service platform using a second alternate dialing number for the subscriber back to the local exchange;
directing at least some of the incoming calls using the first alternate dialing number from the local exchange to the subscriber equipment for the subscriber;
directing at least some of the incoming calls using the second alternate dialing number from the local exchange to the subscriber equipment for the subscriber,
wherein a call directed to the subscriber equipment using the first alternate dialing number has a different associated ring-pattern to a call directed to the subscriber equipment using the second alternate dialing number.

20. The method of claim 19, further comprising forwarding at least some incoming calls from the service platform using a second alternate dialing number for the subscriber back to the local exchange.

21. The method of claim 19, further comprising:
storing settings associated with the main dialing number for the subscriber;
storing settings associated with the second alternate dialing number for the subscriber,
wherein the settings associated with the main dialing number comprise one or more settings which are different from the settings associated with the second alternate dialing number.

22. The method of claim 19, wherein a call directed to the subscriber equipment using the first alternate dialing number has a different associated ring-pattern to a call directed to the subscriber equipment using the second alternate dialing number.

23. A non-transitory computer readable medium having computer-executable instructions stored thereon, which when executed by a processor, cause a computing device to perform a method of providing services to subscribers in a telecommunications network, the subscribers each having subscriber equipment, a main dialing number and a given local exchange with which each of the main dialing numbers is associated, the method comprising:
setting a local exchange to forward incoming calls directed to the main dialing number of a subscriber;
receiving an outgoing call request from first subscriber equipment associated with the subscriber;
in response to receipt of the outgoing call request, creating an incoming call using an alternate dialing number for the subscriber, the created incoming call being directed towards subscriber equipment associated with the subscriber by the local exchange;
creating an outgoing call according to the outgoing call request; and bridging the created incoming call and the created outgoing call.

24. A non-transitory computer readable medium having computer-executable instructions stored thereon, which when executed by a processor, cause a computing device to perform a method of providing services to a plurality of subscribers in a telecommunications network, the subscribers each having subscriber equipment, a main dialing number and a local exchange with which each of the main dialing numbers is associated, the services being of different types including a first service type and a second service type, each of the services of the first service type being supported by and having one or more subscriber-configurability features on the local exchange and each of the services of the second service type not being supported by the local exchange, the method comprising:

setting a call forwarding function at the local exchange for incoming calls directed to a main dialing number for a first subscriber, the call forwarding function, when set, forwarding the calls to a service platform separate from the local exchange;

triggering a first service of the second service type at the service platform for at least some incoming calls forwarded to the service platform by the call forwarding function;

forwarding at least some incoming calls from the service platform using an alternate dialing number for the first subscriber back to the local exchange;

directing incoming calls using the alternate dialing number for the first subscriber from the local exchange to the subscriber equipment for the first subscriber; and reconfiguring the local exchange for the first subscriber, the reconfiguring disabling a subscriber-configurability feature on the local exchange for a first service of the first service type, for the main dialing number for the first subscriber, wherein the reconfiguring is carried out in response to detecting that a particular service or service setting is capable of causing interoperability problems between the local exchange and the service platform.

\* \* \* \* \*